(12) United States Patent
Khalil et al.

(10) Patent No.: US 7,333,451 B1
(45) Date of Patent: Feb. 19, 2008

(54) BUFFER MANAGEMENT FOR MOBILE INTERNET PROTOCOL

(75) Inventors: Mohamed Khalil, Dallas, TX (US);
Emad A. Qaddoura, Plano, TX (US);
Haseeb Akhtar, Garland, TX (US)

(73) Assignee: Nortel Networks Limited, St. Laurent, Quebec (CA)

( * ) Notice: Subject to any disclaimer, the term of this patent is extended or adjusted under 35 U.S.C. 154(b) by 1335 days.

(21) Appl. No.: 09/687,881

(22) Filed: Oct. 13, 2000

Related U.S. Application Data (60) Provisional application No. 60/160,031, filed on Oct. 18, 1999.

(51) Int. Cl.
*H04L 12/66* (2006.01)
*H04Q 7/20* (2006.01)
*H04Q 7/24* (2006.01)

(52) U.S. Cl. ............... 370/331; 370/338; 370/352; 455/436

(58) Field of Classification Search ........ 370/331–395, 370/401–436, 236, 252, 253, 249, 230–235, 370/400; 455/432–439, 442, 445–525
See application file for complete search history.

(56) References Cited

U.S. PATENT DOCUMENTS

| | | | | |
|---|---|---|---|---|
| 5,371,738 | A * | 12/1994 | Moelard et al. | 370/331 |
| 5,440,613 | A * | 8/1995 | Fuentes | 455/436 |
| 5,490,139 | A * | 2/1996 | Baker et al. | 370/312 |
| 5,636,217 | A * | 6/1997 | Moelard | 370/338 |
| 5,862,481 | A * | 1/1999 | Kulkarni et al. | 455/432.2 |
| 5,999,981 | A * | 12/1999 | Willenz et al. | 709/238 |
| 6,023,461 | A * | 2/2000 | Raychaudhuri et al. | 370/331 |
| 6,081,714 | A * | 6/2000 | Wakizaka | 455/437 |
| 6,088,591 | A * | 7/2000 | Trompower et al. | 455/438 |
| 6,252,851 | B1 * | 6/2001 | Siu et al. | 370/236 |
| 6,301,234 | B1 * | 10/2001 | Lee | 370/331 |

(Continued)

FOREIGN PATENT DOCUMENTS

EP 851633 A2 * 12/1997 ............ 370/331

(Continued)

OTHER PUBLICATIONS

Balakrishnan et al., "Improving Reliable Transport and Handoff Performance in Cellular Wireless Networks", Wireless Networks, ACM, US, vol. 1, No. 4, Dec. 1, 1995, pp. 469-481.

(Continued)

*Primary Examiner*—M. Phan
(74) *Attorney, Agent, or Firm*—Haynes and Boone, LLP (57) ABSTRACT

Disclosed is a buffer management method for a mobile node in a mobile IP telecommunication network. The buffer management method supports a handoff of the mobile node from a first agent of a first network to a second agent of a second network. The method begins upon initiation of the handoff. A first message is sent to the first agent requesting the first agent to buffer any packets being sent to the mobile node. While the buffering is being performed, the handoff may be completed to the second agent. Once the handoff is complete, a second message can be sent to the first agent requesting the first agent to forward the buffered packets to the second agent.

28 Claims, 4 Drawing Sheets

U.S. PATENT DOCUMENTS

| | | | |
|---|---|---|---|
| 6,353,607 B1* | 3/2002 | Valentine et al. | 370/349 |
| 6,400,722 B1* | 6/2002 | Chuah et al. | 370/401 |
| 6,414,950 B1* | 7/2002 | Rai et al. | 370/338 |
| 6,473,411 B1* | 10/2002 | Kumaki et al. | 370/331 |
| 6,473,413 B1* | 10/2002 | Chiou et al. | 370/331 |
| 6,526,033 B1* | 2/2003 | Wang et al. | 370/338 |
| 6,539,225 B1* | 3/2003 | Lee | 455/436 |
| 6,553,015 B1* | 4/2003 | Sato | 370/331 |
| 6,577,643 B1* | 6/2003 | Rai et al. | 370/466 |
| 6,611,547 B1* | 8/2003 | Rauhala | 370/331 |
| 6,647,264 B1* | 11/2003 | Sasamoto | 455/445 |
| 6,665,718 B1* | 12/2003 | Chuah et al. | 709/225 |
| 6,697,878 B1* | 2/2004 | Imai | 719/316 |
| 6,766,168 B1* | 7/2004 | Lim | 455/435.1 |
| 6,771,621 B1* | 8/2004 | Lee | 370/331 |

FOREIGN PATENT DOCUMENTS

| | | |
|---|---|---|
| EP | 0 851 633 A2 | 7/1998 |

OTHER PUBLICATIONS

Woo et al, "Handoff Enhancement in Mobile-IP Environment", Universal Personal Communications, Sep. 29, 1996, pp. 760-764.

Perkins, CE, "Mobile IP", IEEE Communications Magazine, vol. 35, No. 5, May 1, 1997, pp. 84-86, 91-99.

Perkins CE et al, "Optimized Smooth Handoffs in Mobile IP", Proceedings IEEE International Symposium on Computers and Communications, Jul. 6, 1999, pp. 340-346.

* cited by examiner

| 0 1 2 3 4 5 6 7 | 8 9 10 11 12 13 14 15 | 16 17 18 19 20 21 22 23 24 25 26 27 28 29 30 31 |
|---|---|---|
| TYPE | LENGTH | RESERVED |

*Fig. 7*

| 0 1 2 3 4 5 6 7 | 8 9 10 11 12 13 14 15 | 16 17 18 19 20 21 22 23 24 25 26 27 28 29 30 31 |
|---|---|---|
| TYPE | LENGTH | RESERVED |
| LEASE TIME || |

*Fig. 8*

| 0 1 2 3 4 5 6 7 | 8 9 10 11 12 13 14 15 | 16 17 18 19 20 21 22 23 | 24 | 25 26 27 28 29 30 31 |
|---|---|---|---|---|
| TYPE | LENGTH | IP COUNT | C | RESERVED |
| IP ADDRESS 0 |||||

○
○
○

| IP ADDRESS N ||
|---|---|
| IP INDEX 1 | ID COUNT | IP ID 1 |
| IP ID 2 | IP ID 3 |

○
○
○

| IP ID M-1 | IP ID M |
|---|---|

○
○
○

| IP INDEX K | ID COUNT | IP ID 1 |
|---|---|---|
| IP ID 2 || IP ID 3 |

○
○
○

| IP ID M-1 | IP ID M |
|---|---|

*Fig. 9*

BUFFER MANAGEMENT FOR MOBILE INTERNET PROTOCOL

CROSS REFERENCE

This application claims the benefit of U.S. Ser. No. 60/160,031 filed Oct. 18, 1999.

TECHNICAL FIELD

This invention relates generally to management techniques for a wireless communications network and, more particularly, to a system and method for facilitating the seamless transfer of data to a mobile node as the mobile node roams in a mobile internet protocol network.

BACKGROUND

There are many emerging trends in the communications world, including the increase in mobile network technology and the rise in packet data networks. There are many types of mobile network technologies, including global systems mobile ("GSM"), code division multiple access ("CDMA"), time division multiple access ("TDMA"), and advanced mobile phone service ("AMPS"). Likewise, there are many types of packet data technologies, such as asynchronous transfer mechanism ("ATM") and internet protocol ("IP"). Packet data technologies send packets of data, or datagrams, in which sections of a message are transmitted in scattered order and then re-ordered at a receiving node.

Mobile IP is an emerging "layer 3" type protocol that allows a mobile node to establish a wireless connection to an IP network. Mobile IP essentially has three major subsystems. A first subsystem is a discovery mechanism that provides mobile nodes with new attachment points (new IP addresses) as they move within the IP network. A second subsystem allows the mobile node to register with its "home network" when it learns its new IP address. A home network is a network, possibly virtual, that has a network prefix matching that of the mobile node's "home address." A home address is an IP address that is assigned for an extended period of time to the mobile node. It remains unchanged regardless of where the mobile node is attached. Standard IP routing mechanisms will deliver packets destined to a mobile node's home address to the mobile node's home network.

A third subsystem allows data to be directed to the mobile node when it is away from its home network by using the registered IP address. For the sake of reference, mobile IP is discussed in greater detail in the book Charles E. Perkins, MOBILE IP: DESIGN PRINCIPLES AND PRACTICES (Computer & Engineering Publishing Group ISBN: 0-201-63469-4, 1998).

In each of these systems, packets of information are often lost when a mobile node during handoff. What is needed is a system and method to reduce the number of lost packets when a mobile node hands-off from one agent to another.

SUMMARY

The present invention provides a buffer management method for a mobile node in a telecommunication network. In one embodiment, the method supports a handoff of the mobile node from a first agent of a first network to a second agent of a second network. The method begins upon initiation of the handoff. A first message is sent to the first agent requesting the first agent to buffer any packets being sent to the mobile node. While the buffering is being performed, the handoff may be completed to the second agent. Once the handoff is complete, a second message can be sent to the first agent requesting the first agent to forward the buffered packets to the second agent.

A technical advance is achieved because the packets of information are buffered as a mobile node changes its network point of attachment, thereby reducing the possibility of lost data packets.

Another technical advance is achieved by reducing an overall amount of buffering being performed by either agent.

DETAILED DESCRIPTION

The present disclosure relates to buffer management, such as can be used for mobile internet protocol. It is understood, however, that the following disclosure provides many different embodiments, or examples, for implementing different features of the invention. Specific examples of components, messages, sequences and arrangements are described below to simplify the present disclosure. These are, of course, merely examples and are not intended to limit the invention from that described in the claims.

The following discussion is divided into seven different sections. The first section describes exemplary networks that may benefit from the present invention. The second section describes basic handoff scenarios for a mobile node in the exemplary networks. The third section describes messages and extensions for use in the handoff scenarios. The fourth and fifth sections describe unique considerations for the mobile node and a foreign agent, respectively. The sixth section describes buffer management for performing the handoff scenarios. Finally, the seventh section provides a conclusion.

Exemplary Networks

Figure 1:
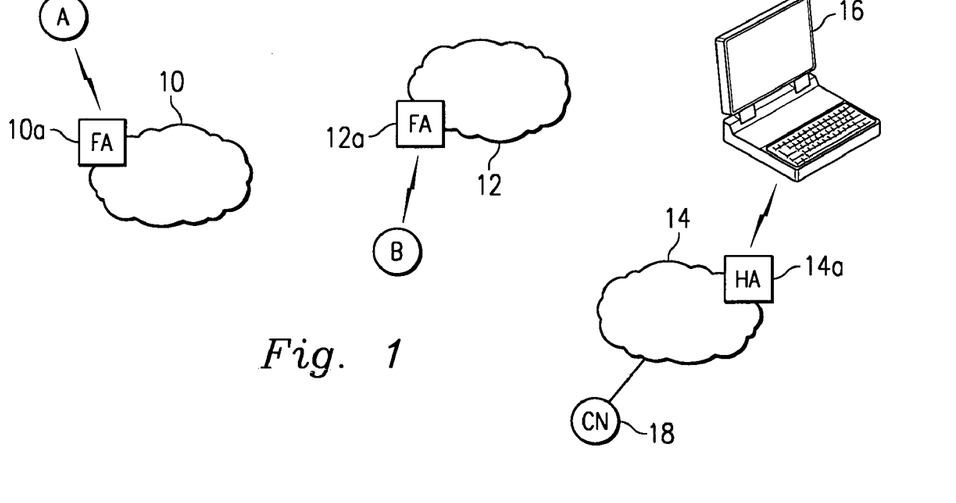
FIG. 1 is a simplified description of several typical wireless networks and agents in which one or more embodiments of the present invention may be employed.

Referring now to FIG. 1 of the drawings, the reference numerals 10, 12, and 14 refer, in general, to simplified conventional mobile IP packet networks. The networks 10, 12, 14 allow a mobile node (MN) 16 to wirelessly communicate with a correspondence node 18, which may be wired or wirelessly connected to the networks. The MN 16 includes hardware components like a conventional wireless device, including a processor, memory, and an interface, for wirelessly connecting to another node. The network 14 is, in the present example, the home network for the MN 16, and maintains current location information for the MN 16 and delivers packets to the MN 16 when it is in away. The MN 16 includes the necessary components to establish a wireless connection to the networks 14 through a home agent (HA) 14a. The HA 14a is a node of the network 14, and includes a conventional amount of processing, memory, and switching capacity.

When away from its home network, the HA 14 provides a "care-of address" for the MN 16. A care-of address is a termination point of a tunnel for packets forwarded to the MN 16 while it is away from home. There are two different types of care-of address: a foreign agent care-of-address is an address of a foreign agent with which the MN 16 is registered, and a collocated care-of address is an externally obtained local address associated with one of its own network interfaces. When the MN 16 is away from home, it registers its care-of address with its HA 14. The MN 16 uses its home address as the source address of all IP packets that it sends, except where otherwise required.

The MN 16 may roam by establishing wireless (or wireline) connections with various foreign agents (FAs). A foreign agent is a router node in a "visited" foreign network which cooperates with the home agent to complete the delivery of packets to the mobile node while it is away from home. Each FA includes a conventional amount of processing, memory, and switching capacity. A visited foreign network is a network other than a mobile node's home network, to which the mobile node is currently connected. Each foreign agent maintains a visitor list of all the visiting mobile nodes.

For the sake of example, FAs 10a, 12a of networks 10, 12, respectively, are illustrated. The mobile node may roam to a location "A" and establish a wireless connection with foreign agent 10a in network 10, and then may roam to a location "B" and establish a wireless connection with foreign agent 12a in network 12.

When the MN 16 is roaming (for instance, at position A), packets sent to the mobile node's home address are intercepted by the home agent 14a, tunneled to the care-of address, received at the tunnel endpoint (FA 10a), and finally delivered to the mobile node. In the reverse direction, packets sent by the MN 16 are generally delivered to their destination using standard IP routing mechanisms, not necessarily passing through the home agent 14a.

Mobile IP has a process called "IP Security." IP security is a tunneling security context between a pair of nodes. For example, IP Security may use a Security Parameters Index for identifying a security context between a pair of nodes among the contexts available in the mobility security association.

Security and Smooth handoff with minimal data loss and delay are desirable goals of any mobile network. Route Optimization techniques attempt to solve some of the issues related to smooth handoff, but difficulties still arise. Additionally, it may be necessary for the MN to authenticate the new FA before allowing it (the new FA) to receive data from the previous FA. In such cases, the new FA is authenticated by the MN's Home Agent (HA) during the handoff.

For example, consider a communicating node (CN) 18 connected to the network 14. The CN 18 may be a computer server that is sending packets to the MN 16. Traditionally, when the MN 16 moves from point A to point B, FA 10a immediately begins to forward packets to FA 12a. This is a problem because handoff to the FA 12a may not be completed. This results in a breach of security because the FA 12a has not been authenticated. This also may result in a loss of one or more packets. To recover from the loss of one or more packets, the CN 18 must resend these packets, thereby degrading the general performance of the overall network.

Instead, the present invention decreases the window of data loss and delay during handoff. In particular, a new buffer management method minimizes the potential loss of data while the MN changes its network point of attachment. In addition, the buffer management method provides a way for the MN to verify the new FA during the handoff, if and when that is needed.

Basic Scenarios

In mobile IP, there are three basic types of handoff. The first type is called Mobile Assisted Handoff (MAH). In MAH, the Mobile Node (MN) discovers that it needs to move to a new FA and initiates the handoff. The second type is called System Assisted Handoff (SAH). In SAH, the new FA initiates the handoff after the MN sends a Registration Request. The third type of handoff is called Previous FA Notification Extension Handoff (PFANEH). In PFANEH, the MN starts the handoff process after entering the new FA. It is assumed that there is a security association between new FA and previous FA while performing PFANEH.

1. Mobile Assisted Handoff

Figure 2:
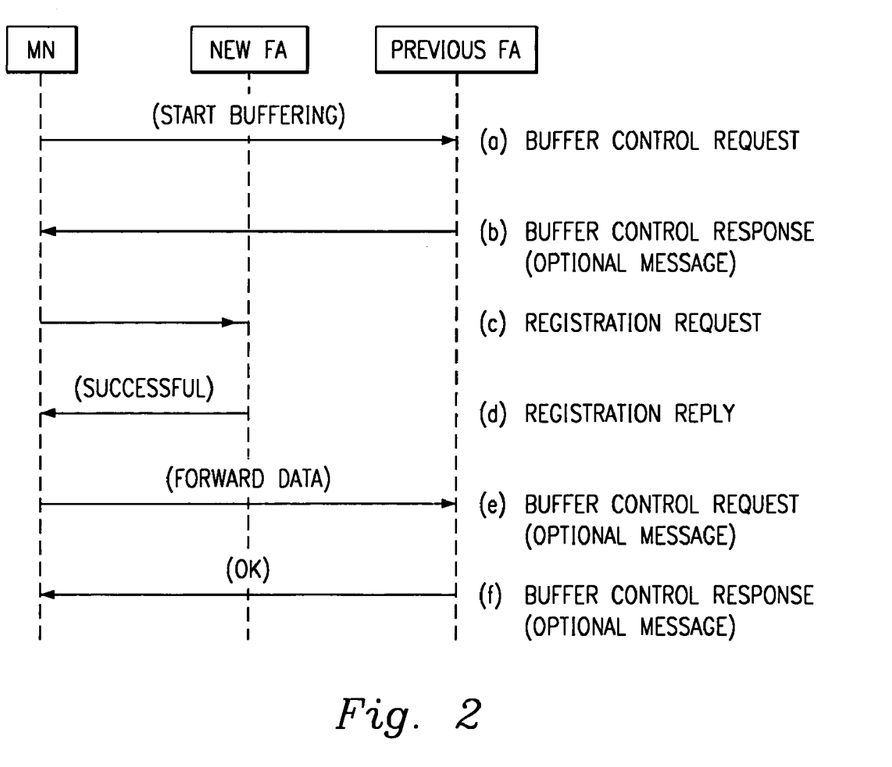
FIGS. 2-4 are flow charts for messages used to facilitate a handoff of a mobile node from one agent to another.

FIG. 2 shows the message flow between the MN and the FA during a Mobile Assisted Handoff. Referring also to FIG. 1 for example, the MN 16 is roaming from a position A to a position B, and is being handed off from FA 10a ("Previous FA") to FA 12a ("New FA"). The following steps are performed in FIG. 2. These steps utilize certain messages which are described in greater detail below, with respect to FIGS. 5-9.

(a) A Buffer Control Request message is sent to the previous FA as soon as the MN discovers that it needs to move to the new FA. The previous FA starts to buffer data that are destined for the MN.

(b) In some cases, the previous FA returns a Buffer Control Response message to the MN.

(c) The MN moves to the new FA and sends a Registration Request message.

(d) The new FA registers the MN and returns a successful Registration Reply message.

(e) The MN sends a Buffer Control Request message to the previous FA requesting it to forward the buffered data.

(f) In some cases, the previous FA returns a Buffer Control Response message to the MN.

During MAH, if the MN loses its direct communication (over the air) with the previous FA and fails to receive an expected Buffer Control Response message, the MN then should, in the present embodiment, change to either SAH or PFANEH mode (as described below) upon entering the new FA.

2. System Assisted Handoff

Figure 3:
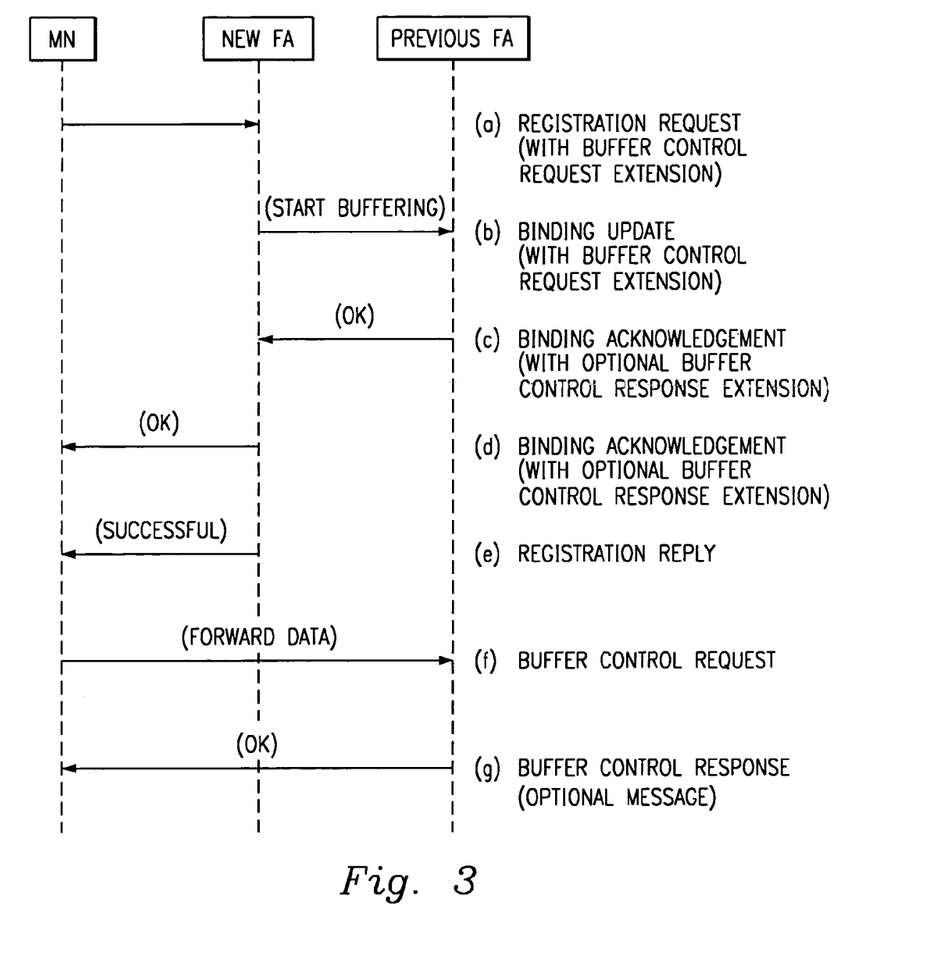

FIG. 3 shows the message flow between the MN and the FA during a System Assisted Handoff. Referring also to FIG. 1 for example, the MN 16 is roaming from a position A to a position B, and is being handed off from FA 10a ("Previous FA") to FA 12a ("New FA"). The following steps are performed in FIG. 3. These steps utilize certain messages which are described in greater detail below, with respect to FIGS. 5-9.

(a) The MN moves to the new FA and sends a Registration Request message with a Buffer Control Request extension.

(b) The new FA sends a Binding Update message with a Buffer Control Request message to the MN. At this point, the new FA should start to buffer data that are destined for the MN.

(c) In some cases, the previous FA sends a Binding Acknowledgment message with a Buffer Control Response extension to the new FA.

(d) In some cases, the new FA forwards the Binding Acknowledgment message with the Buffer Control Response extension to the MN.

(e) The new FA registers the MN and returns a successful Registration Reply message.

(f) The MN sends a Buffer Control Request message to the previous FA requesting it to forward the buffered data.

(f) In some cases, the previous FA returns a Buffer Control Response message to the MN.

During SAH, if a MN receives a successful Registration Reply message before an expected Binding Acknowledgment message from the previous FA, the MN should, in the present embodiment, wait for the Binding Acknowledgment message prior to executing step (f).

3. Previous FA Notification Extension Handoff

Figure 4:
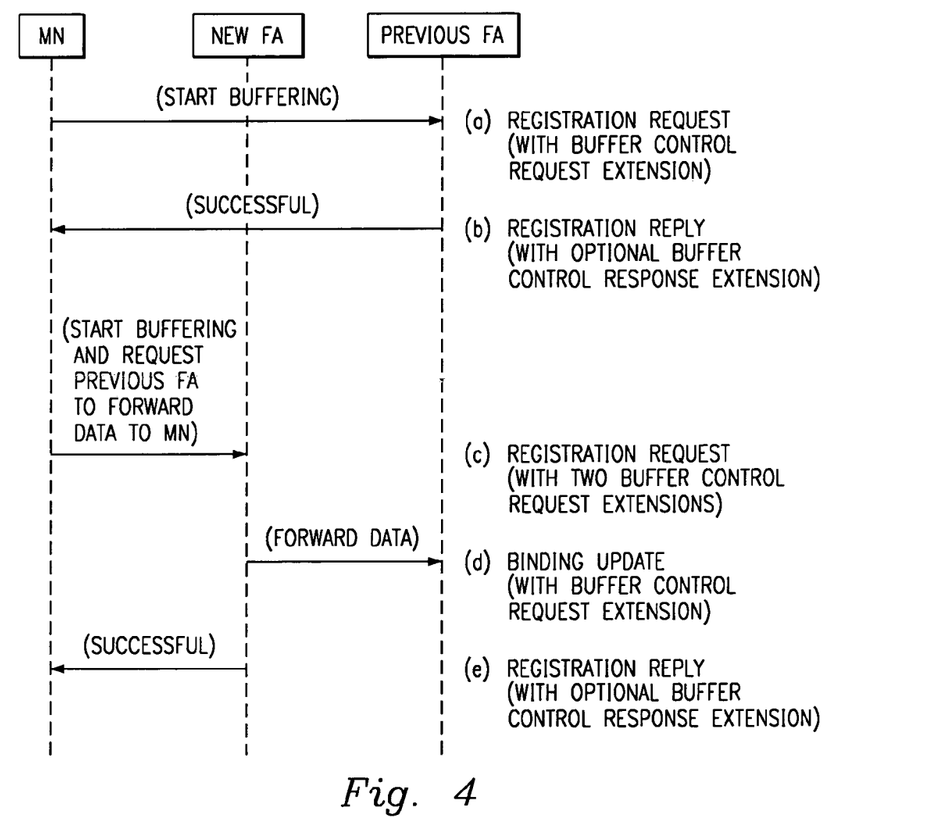

FIG. 4 shows the message flow between the MN and the FA during a handoff that uses Previous Foreign Agent Notification extension. Referring also to FIG. 1 for example, the MN 16 is roaming from a position A to a position B, and is being handed off from FA 10a ("Previous FA") to FA 12a ("New FA"). The following steps are performed in FIG. 4. These steps utilize certain messages which are described in greater detail below, with respect to FIGS. 5-9.

(a) The MN sends a Registration Request message to the FA (e.g., the previous FA) at the initial registration, with a Buffer Control Request extension. The FA allocates a buffer for the MN.

(b) The FA (e.g., the previous FA) sends a Registration Reply message, which may include a Buffer Control Response extension, to the MN.

(c) The MN moves to a new location and sends a Registration Request message to the new FA with a Previous FA Notification extension. It also adds two Buffer Control Request extensions: one for the new FA (with B=1) to start buffering for the MN, and the other for the previous FA (with F=1) so that it can forward the data to the MN. Both of these extensions may include other relevant information (IP Filter Extension, for example) pertaining to buffer management.

(d) The previous FA creates a buffer for the MN and continues to buffer its data. This buffer is created according to the specification provided in the Buffer Control Request extension that was sent with the B bit set (B=1). The new FA also sends a Binding Update to the previous FA with the Previous FA Notification extension as well as the Buffer Control Request extension that was sent with the F bit set (F=1). The previous FA starts to forward data to the MN as soon as it receives the Binding Update message (according to the specifications provided in the Buffer Control Request extension).

(g) The new FA registers the MN and returns a successful Registration Reply message, and may include a Buffer Control Response extension.

Messages and Extensions

In this section, a set of messages and extensions that are used in buffer allocation and management will be further described.

1. Buffer Control Request Message

This message is sent from the MN to the FA to allocate and manage data buffers for the MN. This message may be an individual message or may be added as an extension to Registration Request and Binding Update messages. This may be sent by the mobile node during registration (as an extension to the Registration Request) or it may be sent by the MN prior to (or as soon as) the discovery of handoff. This message is always sent to the FA. This message should, in the present embodiment, be implemented by both the FA and the MN for all of the scenarios (MAH, SAH and PFANEH) mentioned above.

Figure 5:
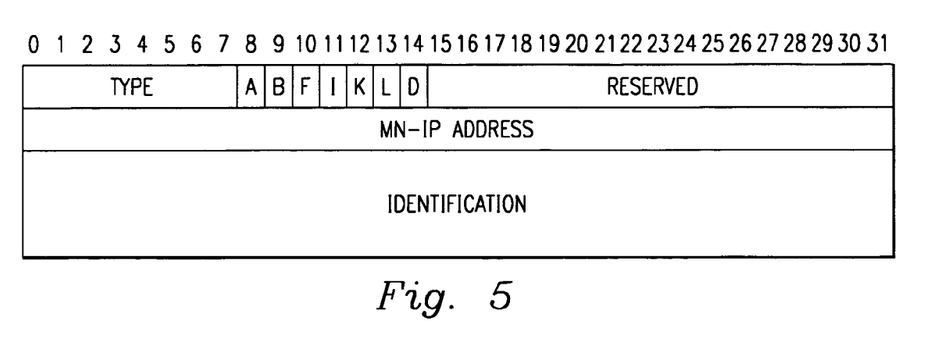
FIGS. 5-9 are messages, such as can be used in the flow charts of FIGS. 2-4.

The structure of this message is shown in FIG. 5. The flags are discussed below:

Type. This is for various type indications.

A. This flag indicates if the FA should allocate a buffer for the MN.

A=0, allocate a buffer of default size (as decided by the FA).

A=1, allocate a buffer of size defined in the Buffer Size extension.

B. This flag indicates if the FA should start buffering data that is destined for the MN. This should not, in the present embodiment, be set simultaneously with the F bit.

B=0, do not buffer data.

B=1, start to buffer data.

D. This flag indicates if the FA should stop buffering, deliver all the packets buffered so far, and then finally delete the buffer previously allocated for the MN.

D=0, do not stop buffering or delete the MN's buffer.

D=1, stop, deliver all packets buffered so far to the MN and then delete the MN's buffer.

F. This flag indicates if the FA should forward data stored in the buffer to the MN. This should not, in the present embodiment, be set simultaneously with either B or K flag.

F=0, do not forward the data.

F=1, forward the data.

I. This flag indicates if the Buffer Control Request message has the Identification field.

I=0, Identification field is not included.

I=1, Identification field is included.

K. This flag indicates if the FA should send an acknowledgment (Buffer Control Response) message to the MN.

K=0, FA should not send any acknowledgment message.

K=1, FA should send an acknowledgment message. Appropriate extensions should, in the present embodiment, be added if the FA can not allocate the buffer resources requested by the MN.

L. This flag indicates the type of the buffer.

L=0, a fixed length buffer.

L=1, a variable length buffer.

MN IP Address. The MN's home IP address.

Identification. An optional 64-bit number, constructed by the MN. It is used for identifying the response to Buffer Control Request message. It is also used as protection a from replay attacks. It's included in the message if the I flag is set (I=1).

2. Buffer Control Response Message

This message is sent from the FA to the MN in response to a Buffer Control Request message. This message may be an individual message or may be added as an extension to Registration Reply and Binding Acknowledgment messages. Some embodiments of the FA and the MN may not use this message.

Figure 6:
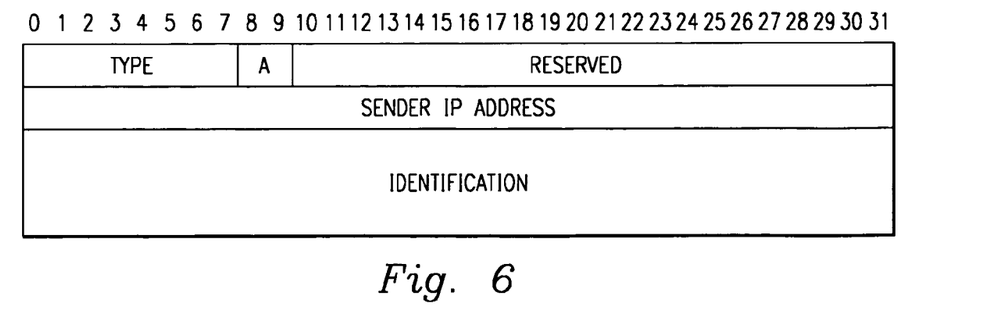

The structure of this message is shown in FIG. 6. The flags are discussed below.

Type. This is for various type indications.

A. This flag indicates if the buffer specifications provided by the MN (in the Buffer Control Request message) are rejected, accepted or partially accepted by the FA. The partial acceptance of the buffer specifications may occur if the FA's system resource can not accommodate all the requirements requested by the MN. If this option is selected, the available buffer resources of the FA should, in the present embodiment, be sent by the appropriate extensions (e.g. Buffer Size Extension or a Buffer Lease Time extension) to the MN.

A=0, The FA accepts the buffer specifications.

A=1, The FA partially accepts the buffer specifications. New specifications are sent with the appropriate extensions.

A=2, The FA rejects the buffer specifications.

Sender IP Address. The IP address of the FA.

Identification. A 64-bit number, constructed by the MN and sent in a Buffer Control Request or Registration Request message. It is used for identifying the response to a Buffer Control Request or Registration Request message. It is also used as a protection from replay attacks.

3. Buffer Size Extension

This extension defines the size of the buffer that should be allocated for the mobile node by the agent or the size of the buffer that is offered by the agent to the mobile node.

Figure 7:
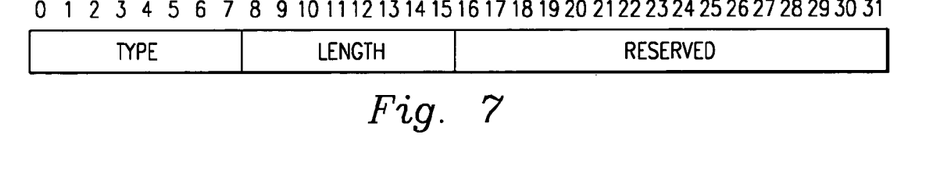

The structure of this message is shown in FIG. 7. The flags are discussed below.

Type. This is for various type indications.

Length. The length of this extension in number of bytes.

Size. The size of the buffer required by the MN or the size of the buffer offered by the FA to the MN. The size is of 1K increments.

4. Buffer Lease Time Extension

This extension defines a lease time of the buffer that should be allocated to the mobile node by the mobile agent or the lease time of the buffer that is offered by mobile agent to the mobile node.

Figure 8:
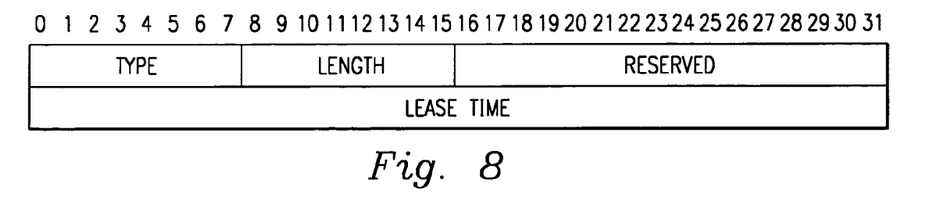

The structure of this message is shown in FIG. 8. The flags are discussed below.

Type. This is for various type indications.

Length. The length of this extension in number of bytes.

Lease Time. The lease time of the buffer required by the mobile node or the lease time of the buffer offered by the mobile agent to the mobile node. The lease time is counted in seconds and the value 0XFFFFFFFF is a reserved number to indicate infinite time.

5. IP Filter Extension

This extension is used to filter (e.g., discard) the data packets destined for the MN based on their source IP addresses and the packet Identification field.

Figure 9:
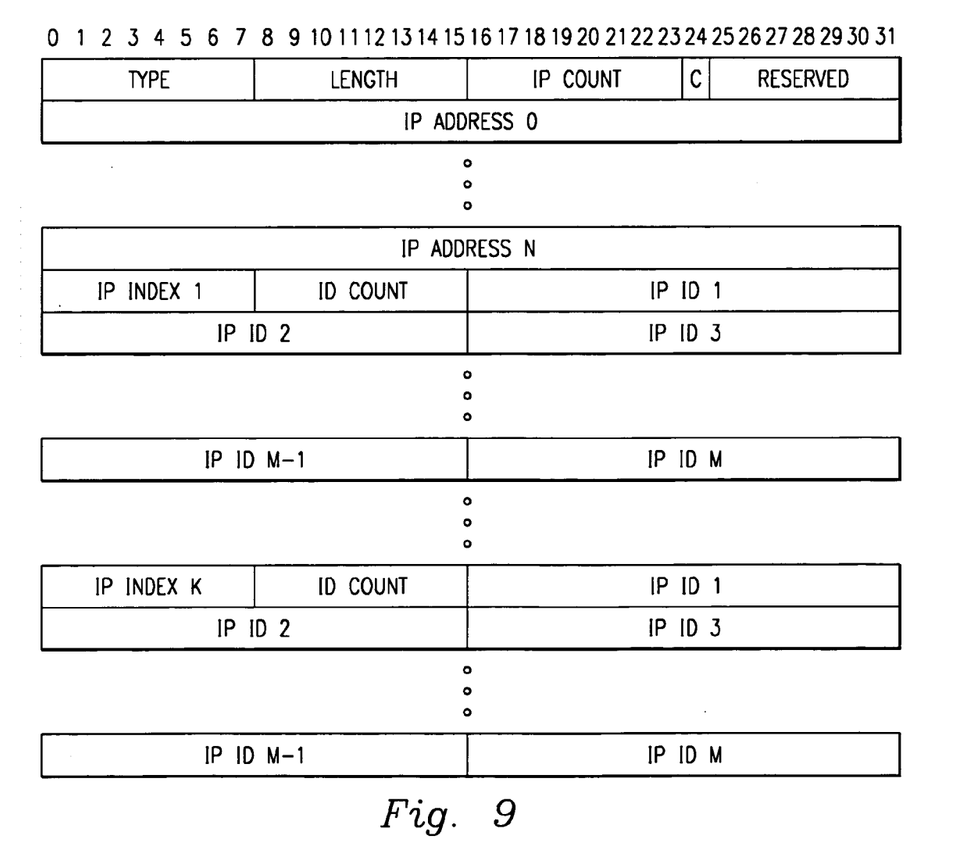

The structure of this message is shown in FIG. 9. The flags are discussed below.

Type. This is for various type indications.

Length. The length of this extension in number of bytes.

IP Count. The number of IP addresses listed in this extension.

C. This flag indicates if the FA should buffer the packets that have the same or different source IP addresses listed in this extension. This flag should be checked only for those IP addresses that do not include any IP IDs in this extension.

C=0, buffer or forward packets that have the same IP addresses as listed in this extension.

C=1, buffer or forward packets that do not have the same IP addresses as listed in this extension.

IP Address(es). The IP address(es) included in this extension.

ID Count. The number of IP identifications included per IP address.

IP Index. This field uniquely identifies an IP address from the list of the IP addresses included in this extension. The value of this field corresponds to the sequence number (starting at zero) in which a particular IP address is listed. For example, if this field contains zero (0), then it identifies the first IP address listed in this extension. Hence, all IP IDs corresponding to that IP address are included in a tuple:

<IP Index=0, ID Count=n, IP ID1 . . . IP IDn>, where n is the number of IP IDs for this particular IP address. Similarly, if an IP Index field contains two (2), then all the IP IDs listed following the tuple:

<IP Index=2, ID Count=n, IP ID1 . . . IP IDn> correspond to the third IP address listed in this extension.

If a particular IP address does not have any IP IDs, then the sequence number of that IP address should not, in the present embodiment, be present in the list of IP Index fields. For example, if the second IP Address listed does not have any IP IDs, then any IP Index with a value of one (1) should not, in the present embodiment, be present in this extension. If any IP address listed in the this extension is not identified by the IP Index field, then all of those IP addresses should, in the present embodiment, be completely filtered (based on the C flag).

IP ID. The IP identification(s) included for the IP address identified by an IP Index. If the very last IP ID happens to be in the lower 16 bytes, then the upper 16 bytes should, in the present embodiment, be padded.

6. Authentication Extension

This extension is used to authenticate Buffer Control Request and Buffer Control Response messages, only if they are sent independently (that is, they are not sent as extensions to a Registration Request or Binding Update message).

This extension has the same format and default algorithm support requirements as the Authentication Extensions (MN-FA, MN-HA, HA-FA) defined in the base Mobile IP. However, it should, in the present embodiment, have its own type.

An authenticator value may also be included. The authenticator value can be computed from the stream of bytes including the shared secret key, payload, prior extensions, and the type and length of this extension.

Mobile Node Considerations

The MN may send the Buffer Control Request message to the FA as a separate message or as an extension to a Registration Request message. The MN may receive the Buffer Control Response from the FA as a separate message or as an extension to the Registration Reply message.

The MN should, in the present embodiment, explicitly notify the FA (e.g., via the IP Filter extension) if the buffering needs to be discriminated based on the source IP address and/or the IP Identification field.

The MN may add two Buffer Control Request extensions to a single Registration Request message while sending it to a FA. This situation may occur when a MN needs to notify a new FA to allocate a buffer, and at the same time, the MN needs to notify the previous FA (e.g., via the new FA) to forward buffered data. The MN should, in the present embodiment, also include a Previous FA Notification extension to this Registration Request message. In this case, the MN should set the B bit (B=1) in the Buffer Control Request message that is destined for the new FA. The MN should also set the F bit (F=1) in the Buffer Control Request message that is destined for the previous FA.

Foreign Agent Considerations

The FA may receive the Buffer Control Request from a MN as a separate message or as an extension to a Registration Request message. The FA may send a Buffer Control Request message to another FA as a separate message or as an extension to a Binding Update message.

The FA may send the Buffer Control Response to a MN as a separate message or as an extension to the Registration Reply message.

The FA may receive two Buffer Control extensions in a single Registration Request message from a MN. This Registration Request should, in the present embodiment, also include a Previous FA Notification extension. The FA should, in the present embodiment, allocate the buffer resources for the MN according to the specifications provided by the Buffer Control Request that has its B bit set (B=1). The FA should, in the present embodiment, send the other Buffer Control Request that has its F bit set (F=1) to the previous FA (as detailed in the Previous FA Notification extension) as an extension to the Binding Update message.

The FA, by default, should, in the present embodiment, buffer all the packets destined for the MN unless otherwise specified by the IP Filter extension.

The FA should, in the present embodiment, follow the format of these messages as described herein.

Buffer Management

1. Storing Data

The data stored in the buffer is managed according to the type of buffer mentioned in the T field of the System Change Request message. If the length of the buffer is fixed as mentioned in the L field of the Buffer Control Request message then the data will be stored in the buffer using a FIFO (First In First Out) policy. If and when the buffer gets full, data at the front of the buffer (the oldest data) is discarded to make room for new data inserted at the end of the buffer.

If the length of the buffer is variable and the buffer is full then the system will try to expand the size of the buffer to accommodate the new coming data. If the expansion is impossible then the data at the front of the buffer is discarded to make room for new data. The discarded data will be lost unless the F flag was set (F=1) in the Buffer Control Request Message. In that case, the data will be forwarded to the new FA.

2. Buffer Allocation

One of the following cases occurs during buffer allocation when the MN sends Buffer Control Request message to the FA with A bit set to 1 (one):

1—If no buffer is allocated for the MN then the allocation of buffer will be handled as follows:

If the K is set to 0 (zero) and the MN includes the Buffer Size extension and/or Buffer Lease Time extension, then the buffer is allocated according to the size and the lease time mentioned in these extensions.

If, however, the FA is unable to accommodate the specifications (size, lease time etc.) requested by the MN, the default values are then used to allocate the buffer.

If either one or all of these extensions are not included then the FA's default values are used to allocate the buffer.

If the K flag is set to 1 (one) and the MN's requested buffer specifications (included in the Buffer Size extension and/or Buffer Lease Time extension) can not be accommodated by the FA, then it (the FA) should, in the present embodiment, suggest its own buffer specifications (size, lease time etc.) to the MN through the Buffer Control Response message using the appropriate extensions. At the same time, the FA should, in the present embodiment, allocate those suggested buffer resources for the MN.

If the new buffer specifications (size, lease time, etc.) sent by the FA are not acceptable to the MN, then the MN may send a new Buffer Control Request message to the FA with the new specifications.

If the FA receives a Buffer Control Request message with both A and B flags set to 1 (one), the allocation of the buffer is done first followed by the start of buffering of all the appropriate packets that are destined for the MN.

2—If the FA receives a Buffer Control Request message for a MN that has already allocated buffer, the FA then re-allocates the buffer according the most recent Buffer Control Request message.

3. Forwarding Data

Upon receiving a Buffer Control Request message with F=1 and D=1, the FA should, in the present embodiment, delete the buffer allocated to the MN after forwarding the entire buffer. Future packets received after this message are lost.

Upon receiving a Buffer Control Request message with F=1 and D=0, the FA should, in the present embodiment, delete the buffer allocated to the MN after forwarding the entire buffer. Future packets received after this message are immediately (without being buffered) forward to the MN. The filtering rules (if any) specified while allocating the buffer should, in the present embodiment, be kept in place. The forwarding will continues until the lease time expires.

4. Buffer Deletion

The buffer will be implicitly deleted if the lease time expires. It will be explicitly deleted if the MN sends a Buffer Control Request message with the D flag set to 1 (one).

CONCLUSION

The present invention provides a unique system and method that manages packets and other types of data in handoff situations, such as those that occur in a Mobile IP network. It is understood that the above disclosure provides many different embodiments, or examples, for implementing different features. Techniques and requirements that are only specific to certain embodiments should not be imported into other embodiments. Also, specific examples of networks, components, and formats are described below to simplify the present disclosure. These are, of course, merely examples and are not intended to limit the invention from that described in the claims.

The invention claimed is:

1. A method for supporting a handoff of a mobile node from a first agent of a first network to a second agent of a second network, the method comprising the steps of:

upon initiation of the handoff, sending a first message to the first agent requesting the first agent to buffer at the first agent all packets being sent to the mobile node, wherein the first message is part of a registration request protocol to the second agent;

completing the handoff of the mobile node to the second agent; and responsive to the completing, sending a second message to the first agent requesting the first agent to forward the packets buffered at the first agent to the second agent, wherein the second message is also a part of the registration request protocol.

2. The method of claim 1 wherein the second message occurs after the second agent has been authorized.

3. The method of claim 1 wherein the first and second networks are mobile internet protocol networks.

4. The method of claim 3 wherein the second agent is a foreign agent to the mobile node.

5. The method of claim 1 wherein the mobile node sends the first message to the first agent.

6. A computer program product for facilitating a handoff of a mobile node from a first agent to a second agent, the computer program product comprising a computer-readable medium having stored thereon computer-executable instructions for:
- determining that the handoff is to be initiated;
- before a transmission of a handoff request message, sending a first message to the first agent requesting the first agent to buffer at the first agent any packets being sent to the mobile node, wherein the first message is part of a registration request protocol to the second agent;
- completing the handoff of the mobile node to the second agent; and
- responsive to the completing, sending a second message to the first agent requesting the first agent to forward the packets buffered at the first agent to the second agent, wherein the second message is also a part of the registration request protocol.

7. The computer program product of claim 6 wherein the second message occurs after the second agent has been authorized.

8. The computer program product of claim 6 wherein the first and second networks are mobile internet protocol (IP) networks.

9. The computer program product of claim 8 wherein the second agent is a foreign agent to the mobile node.

10. The computer program product of claim 6 wherein the second agent sends the first message to the first agent.

11. The computer program product of claim 6 wherein the computer-readable medium further has stored thereon computer-executable instructions for sending, by the mobile node, a buffer control request.

12. The computer program product of claim 6 wherein the computer-readable medium further has stored thereon computer-executable instructions for sending an indicator to the second agent that the mobile node has requested buffering.

13. The computer program product of claim 6 wherein the first message includes an indicator of a buffer size.

14. The computer program product of claim 6 wherein the computer-readable medium further has stored thereon computer-executable instructions for:
- discarding, by the first agent, predetermined packets when a maximum number of packets have been received.

15. The computer program product of claim 6 wherein the computer-readable medium further has stored thereon computer-executable instructions for:
- signaling the first agent to delete the buffered packets.

16. The computer program product of claim 15 wherein the computer-readable medium further has stored thereon computer-executable instructions for:
- signaling forwarding any packets received after the buffered packets are deleted.

17. The computer program product of claim 6 wherein the first message includes an indicator of a maximum length of time that buffering is needed.

18. The computer program product of claim 6 wherein the first message includes an indicator of authenticity for the buffering.

19. The computer program product of claim 8 wherein the first message includes an IP filter to identify certain packets that do not need to be buffered.

20. A computer program product for a new agent of a new network to initiate communication with a mobile node, the computer program product comprising a computer-readable medium having stored thereon computer-executable instructions for:
- determining that the mobile node is in handoff from an old agent to a new agent;
- sending a first message to the old agent requesting the old agent to buffer at the old agent any packets being sent to the mobile node, wherein the first message is part of a registration request protocol to the new agent;
- completing the handoff of the mobile node to the new agent; and
- responsive to the completing, sending a second message to the old agent requesting the old agent to forward the packets buffered at the old agent to the new agent, wherein the second message is also a part of the registration request protocol.

21. The computer program product of claim 20 wherein the old and new networks are mobile internet protocol networks.

22. The computer program product of claim 20 wherein the new agent is a foreign agent to the mobile node.

23. The computer program product of claim 20 wherein the first message is sent by the mobile node.

24. The computer program product of claim 20 wherein the new agent sends the first message to the old agent.

25. A system for supporting a handoff of a mobile node from a first agent of a first network to a second agent of a second network, the system comprising:
- means for sending, before a transmission of a handoff request message, a first message to the first agent requesting the first agent to buffer at the first agent any packets being sent to the mobile node, wherein the first message is part of a registration request protocol to the second agent;
- means for completing the handoff of the mobile node to the second agent; and
- means responsive to completing the handoff for sending a second message to the first agent requesting the first agent to forward the packets buffered at the first agent to the second agent, wherein the second message is also a part of the registration request protocol.

26. The method of claim 25 wherein the second message occurs after the second agent has been authorized.

27. A computer program product for facilitating a handoff of a mobile node from a first agent to a second agent, the computer program product comprising a computer-readable medium having stored thereon computer-executable instructions for:
- determining that the handoff is to be initiated;
- the second agent sending a first message to the first agent requesting the first agent to buffer at the first agent any packets being sent to the mobile node, wherein the first message is part of a registration request protocol to the second agent;
- completing the handoff of the mobile node to the second agent; and
- responsive to the completing, sending a second message to the first agent requesting the first agent to forward the packets buffered at the first agent to the second agent, wherein the first message is part of a registration request protocol to the second agent.

28. The computer program product of claim 27 wherein the second message occurs after the second agent has been authorized.

* * * * *